(12) United States Patent
Huang et al.

(10) Patent No.: US 8,350,545 B2
(45) Date of Patent: Jan. 8, 2013

(54) CURRENT BALANCER

(75) Inventors: Hua-Chiang Huang, Taoyuan County (TW); Chih-Lien Chang, Hsinchu County (TW); Han-Pang Wang, Tainan County (TW)

(73) Assignee: uPI Semiconductor Corp., Hsinchu County (TW)

(*) Notice: Subject to any disclaimer, the term of this patent is extended or adjusted under 35 U.S.C. 154(b) by 238 days.

(21) Appl. No.: 12/977,004

(22) Filed: Dec. 22, 2010

(65) Prior Publication Data

US 2012/0049813 A1    Mar. 1, 2012

(30) Foreign Application Priority Data

Aug. 30, 2010  (TW) .............................. 99129127 A

(51) Int. Cl.
  *G05F 1/575*   (2006.01)
  *G05F 1/618*   (2006.01)
(52) U.S. Cl. ....................................... 323/272; 323/288
(58) Field of Classification Search .................. 323/223, 323/225, 268, 271, 272, 283, 288; 363/65
  See application file for complete search history.

(56) References Cited

U.S. PATENT DOCUMENTS

| | | | | |
|---|---|---|---|---|
| 5,905,369 A * | 5/1999 | Ishii et al. | ...................... | 323/272 |
| 6,137,274 A * | 10/2000 | Rajagopalan | .................. | 323/272 |
| 6,278,263 B1 * | 8/2001 | Walters et al. | ................ | 323/272 |
| 6,414,470 B1 * | 7/2002 | Liu et al. | ......................... | 323/272 |
| 6,448,746 B1 * | 9/2002 | Carlson | .......................... | 323/272 |
| 2009/0167080 A1 | 7/2009 | Carpenter et al. | | |
| 2010/0033154 A1 | 2/2010 | Cheng et al. | | |

* cited by examiner

*Primary Examiner* — Gary L Laxton
(74) *Attorney, Agent, or Firm* — Jianq Chyun IP Office

(57) ABSTRACT

A current balancer suitable for a multi-phase power converting device is provided. The current balancer includes an error detection unit and a plurality of pulse control units. Each of the pulse control units includes a current-to-voltage converter, a charging and discharging controller, a capacitor, and a comparator. The error detection unit detects a plurality of channel currents generated by the multi-phase power converting device, and generates a plurality of error currents by calculating. The charging and discharging controller provides a charging voltage or a discharging voltage according to a constant pulse-width modulation (PWM) signal. When the channel currents are balanced, the comparator generates a PWM signal with a constant duty cycle. When the channel currents are not balanced, an error voltage generated by the current-to-voltage converter is used to adjust a voltage level of the charging voltage or the discharging voltage, so that the PWM signal is varied correspondingly.

12 Claims, 5 Drawing Sheets

CURRENT BALANCER

CROSS-REFERENCE TO RELATED APPLICATION

This application claims the priority benefit of Taiwan application serial no. 99129127, filed on Aug. 30, 2010. The entirety of the above-mentioned patent application is hereby incorporated by reference herein and made a part of this specification.

BACKGROUND

1. Field of the Invention

The invention relates to a current balancer. Particularly, the invention relates to a current balance of a multi-phase power converting device.

2. Description of Related Art

A multi-phase power converting device is formed by a plurality of switching converter units connected in parallel, wherein each of the switching converter units can be regarded as a channel or a single phase. Moreover, the multi-phase power converting device has following advantages: (1). A relatively large transient current can be provided by connecting a plurality of small power-output units in parallel; (2). When a part of the switching converter units is malfunctioned, an operation of the multi-phase power converting device is still maintained, so that a high system reliability is achieved; (3). Components of smaller voltage and current resistance can be used to form the switching converter unit, so as to reduce a hardware cost of the system. Therefore, the multi-phase power converting device is widely used in various system power supplies.

In an actual application, to achieve a heat balance, channel currents generated by the switching converter units have to be equivalent. However, since features of the components used in each of the switching converter unit are different, the channel currents generated by the switching converter units are generally unbalanced. To resolve the above problem, the current multi-phase power converting device generally uses a current balancer to balance the channel currents generated by the switching converter units, so as to improve a power conversion efficiency of the power converter.

In other words, the current balancer is an indispensable part of the current multi-phase power converting device.

SUMMARY OF THE INVENTION

The invention is directed to a current balancer, in which a plurality of pulse control units is used to control a plurality of switching converter units in a multi-phase power converting device, so that channel currents generated by the switching converter units are balanced.

The invention is directed to a current balancer, in which a single pulse control unit is used to control a plurality of switching converter units in a multi-phase power converting device, so as to improve a power conversion efficiency of the multi-phase power converting device.

The invention provides a current balancer suitable for a multi-phase power converting device. The multi-phase power converting device includes N switching converter units, wherein N is an integer greater than or equal to 2. The current balancer includes an error detection unit and N pulse control units. The error detection unit detects N channel currents generated by the switching converter units, and generates N error currents by calculating the channel currents. The pulse control units generate N pulse-width modulation (PWM) signals according to a constant PWM signal and the error currents, so as to control the switching converter units, wherein i is an integer, and $1 \leq i \leq N$, and an i-th pulse control unit includes a current-to-voltage converter, a charging and discharging controller, a capacitor, and a comparator.

The charging and discharging controller provides a charging voltage or a discharging voltage according to the constant PWM signal. The current-to-voltage converter generates an error voltage according to an i-th error current, and transmits the error voltage to the charging and discharging controller so as to adjust a voltage level of the charging voltage or the discharging voltage. A first end of the capacitor is electrically connected to a ground, and a second end of the capacitor is electrically connected to the charging and discharging controller. In this way, the capacitor is charged or discharged according to the charging voltage or the discharging voltage. A positive input terminal of the comparator receives a reference voltage, a negative input terminal of the comparator is electrically connected to the second end of the capacitor, and an output terminal of the comparator generates an i-th PWM signal.

The invention provides a current balancer suitable for a multi-phase power converting device. The multi-phase power converting device includes N switching converter units, wherein N is an integer greater than or equal to 2. The current balancer includes an error detection unit, a multiplexer, a pulse control unit and a demultiplexer. The error detection unit detects N channel currents generated by the switching converter units, and generates N error currents by calculating the channel currents. The multiplexer receives the error currents and outputs the error currents one-by-one to serve as a specific error current. The pulse control unit generates a pulse-width modulation (PWM) signal according to a constant PWM signal and the specific error current. The demultiplexer receives the PWM signal and transmits the PWM signal to one of the switching converter units according to an operation of the multiplexer.

Moreover, the pulse control unit includes a current-to-voltage converter, a charging and discharging controller, a capacitor, and a comparator. The charging and discharging controller provides a charging voltage or a discharging voltage according to the constant PWM signal. The current-to-voltage converter generates an error voltage according to the specific error current, and transmits the error voltage to the charging and discharging controller so as to adjust a voltage level of the charging voltage or the discharging voltage. A first end of the capacitor is electrically connected to a ground, and a second end of the capacitor is electrically connected to the charging and discharging controller. In this way, the capacitor is charged or discharged according to the charging voltage or the discharging voltage. A positive input terminal of the comparator receives a reference voltage, and a negative input terminal of the comparator is electrically connected to the second end of the capacitor. As the capacitor is charged or discharged, an output terminal of the comparator generates the PWM signal, and the PWM signal is varied along with the specific error current.

According to the above descriptions, the pulse control unit uses the charging and discharging controller to periodically charge and discharge the capacitor therein, so as to generate the constant PWM signal when the channel currents are balanced. Moreover, when the channel currents generated by the switching converter units are not balanced, an error voltage generated by the current-to-voltage converter is used to adjust a voltage level of the charging voltage or the discharging voltage, so as to correspondingly vary the PWM signal. In this way, the current balancer can maintain a balance of the channel currents, so as to improve a power conversion efficiency of the multi-phase power converting device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
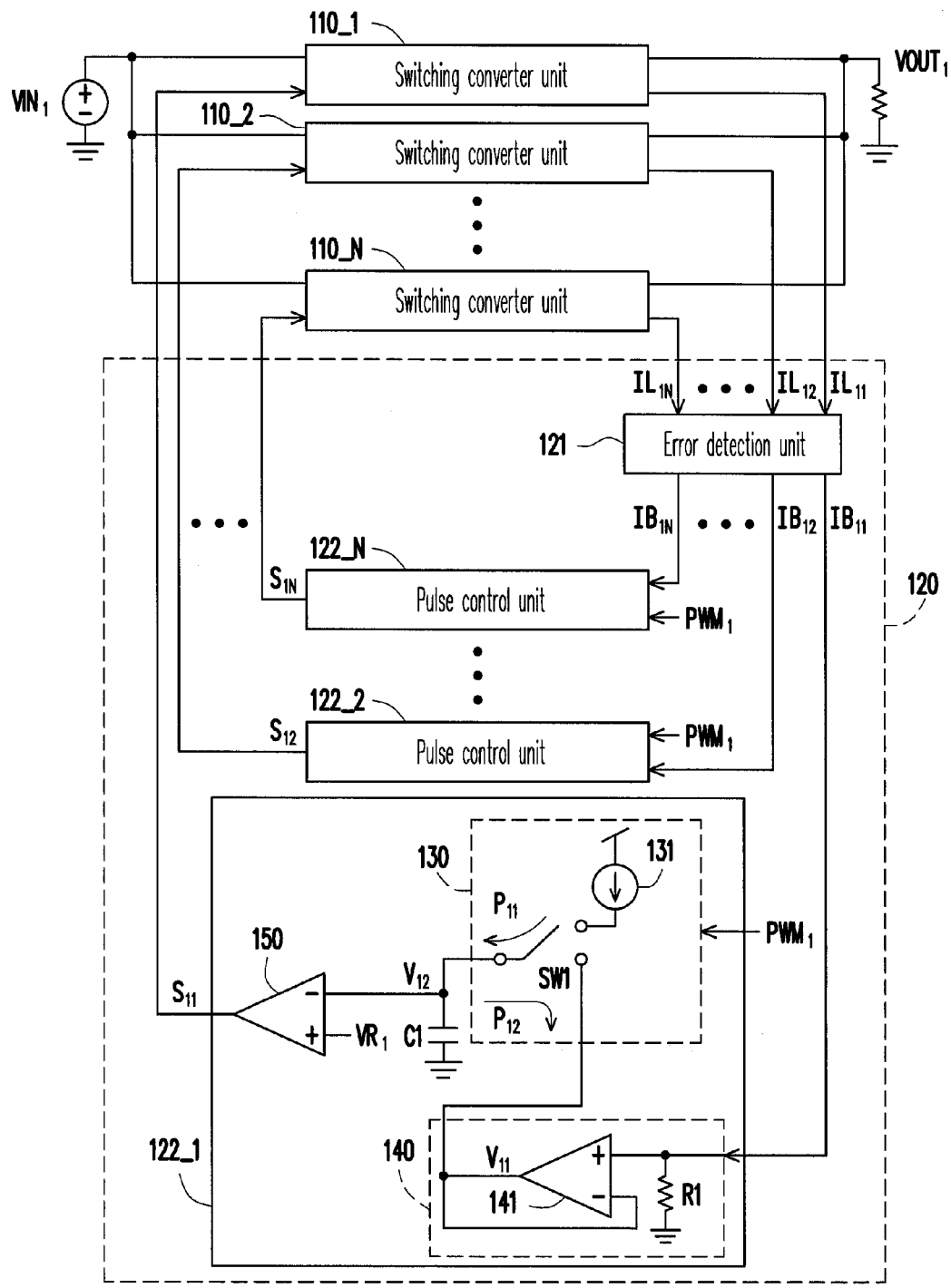
FIG. 1 is a structural schematic diagram illustrating a multi-phase power converting device according to an embodiment of the invention.

FIG. 1 is a structural schematic diagram illustrating a multi-phase power converting device according to an embodiment of the invention. Referring to FIG. 1, the multi-phase power converting device 100 includes N switching converter units 110_1-110_N and a current balancer 120, wherein N is an integer greater than or equal to 2. The switching converter units 110_1-110_N are connected in parallel. Moreover, the switching converter units 110_1-110_N convert an input voltage $VIN_1$ into an output voltage $VOUT_1$ under control of N pulse-width modulation (PWM) signals $S_{11}$-$S_{1N}$.

On the other hand, the current balancer 120 and the switching converter units 110_1-110_N form a feedback loop, so as to control the PWM signals $S_{11}$-$S_{1N}$ according to a feedback mechanism. In this way, N channel currents $IL_{11}$-$IL_{1N}$ generated by the switching converter units 110_1-110_N can be balanced, so that a power conversion efficiency of the multi-phase power converting device 100 is improved. To fully convey the spirit of the invention to those skilled in the art, a structure and an operation principle of the current balancer 120 are described in detail below.

The current balancer 120 includes an error detection unit 121 and N pulse control units 122_1-122_N. The error detection unit 121 detects the N channel currents $IL_{11}$-$IL_{1N}$, and generates N error currents by calculating the channel currents $IL_{11}$-$IL_{1N}$.

Figure 2:
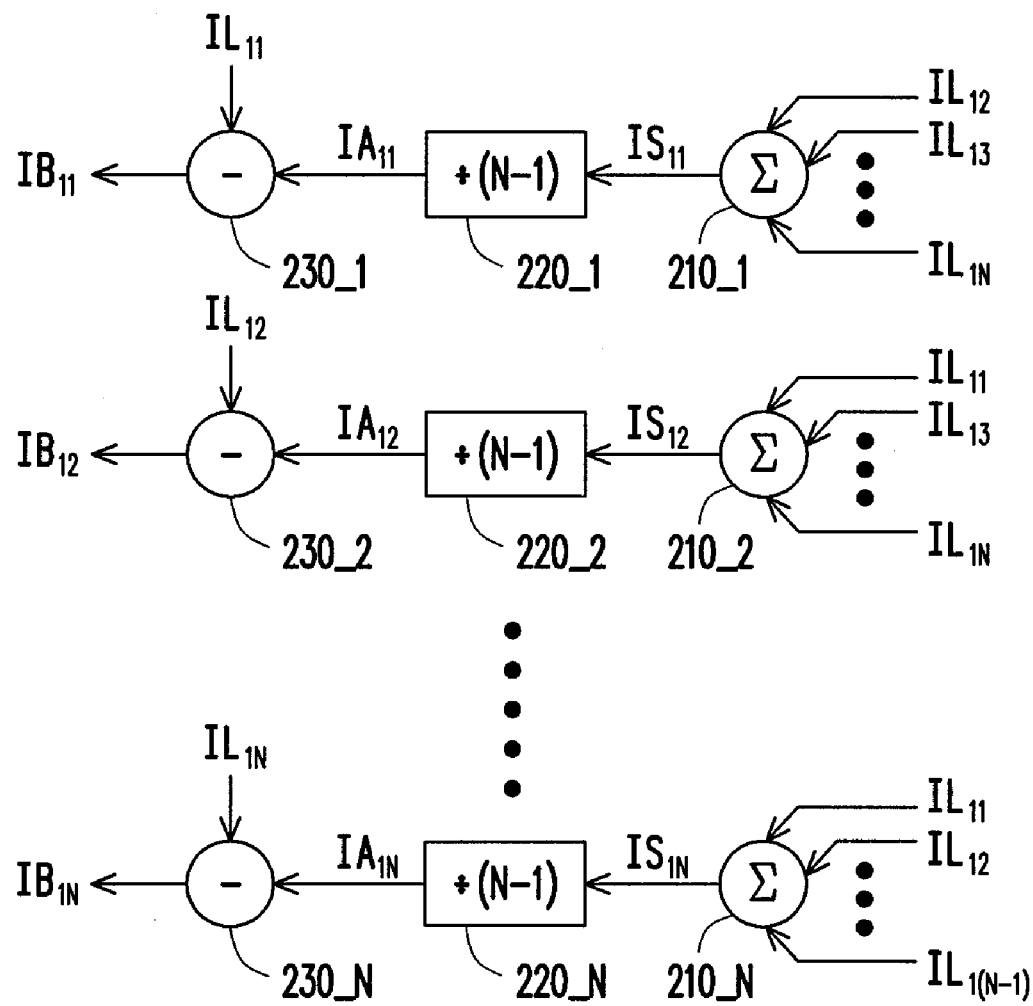
FIG. 2 is a block diagram illustrating an error detection unit according to an embodiment of the invention.

For example, FIG. 2 is a block diagram illustrating an error detection unit according to an embodiment of the invention. Referring to FIG. 2, the error detection unit 121 includes N adders 210_1-210_N, N dividers 220_1-220_N, and N subtracters 230_1-230_N. The adder 210_1, the divider 220_1, and the subtracter 230_1 form a calculation path based on the channel current $IL_{11}$ for generating the error current $IB_{11}$. In detail, the adder 210_1 accumulates the channel currents $IL_{12}$-$IL_{1N}$ except the channel current $IL_{11}$ for generating a sum current $IS_{11}$. The divider 220_1 divides the sum current $IS_H$ by (N−1) to generate an average current $IA_{11}$. The subtracter 230_1 subtracts the average current $IA_{11}$ from the channel current $IL_{11}$ to generate the error current $IB_{11}$. In other words, the error current $IB_{11}$ is calculated according to a following equation (1):

$$IB_{11} = IL_{11} - \frac{(IL_{12} + IL_{13} + \ldots + IL_{1N})}{(N-1)} \tag{1}$$

Similarly, the adder 210_2, the divider 220_2, and the subtracter 230_2 form a calculation path based on the channel current $IL_{12}$ for generating the error current $IB_{12}$. In detail, the adder 210_2 accumulates the channel currents $IL_{11}$, $IL_{13}$-$IL_{1N}$ except the channel current $IL_{12}$ for generating a sum current $IS_{12}$. The divider 220_2 divides the sum current $IS_{12}$ by (N−1) to generate an average current $IA_{12}$. The subtracter 230_2 subtracts the average current $IA_{12}$ from the channel current $IL_{12}$ to generate the error current $IB_{12}$. In other words, the error current $IB_{12}$ is calculated according to a following equation (2):

$$IB_{12} = IL_{12} - \frac{(IL_{11} + IL_{13} + \ldots + IL_{1N})}{(N-1)} \tag{2}$$

Operations of the other adders 210_3-210_N, the dividers 220_3-220_N, and the subtracters 230_3-230_N can be deduced by analogy. In this way, when the channel currents $IL_{11}$-$IL_{1N}$ are not balanced, the error detection unit 121 generates the error currents $IB_{11}$-$IB_{1N}$ that are not equal to zero. Comparatively, when the channel currents $IL_{11}$-$IL_{1N}$ are balanced, the error currents $IB_{11}$-$IB_{1N}$ are approximately equal to zero.

Figure 3:
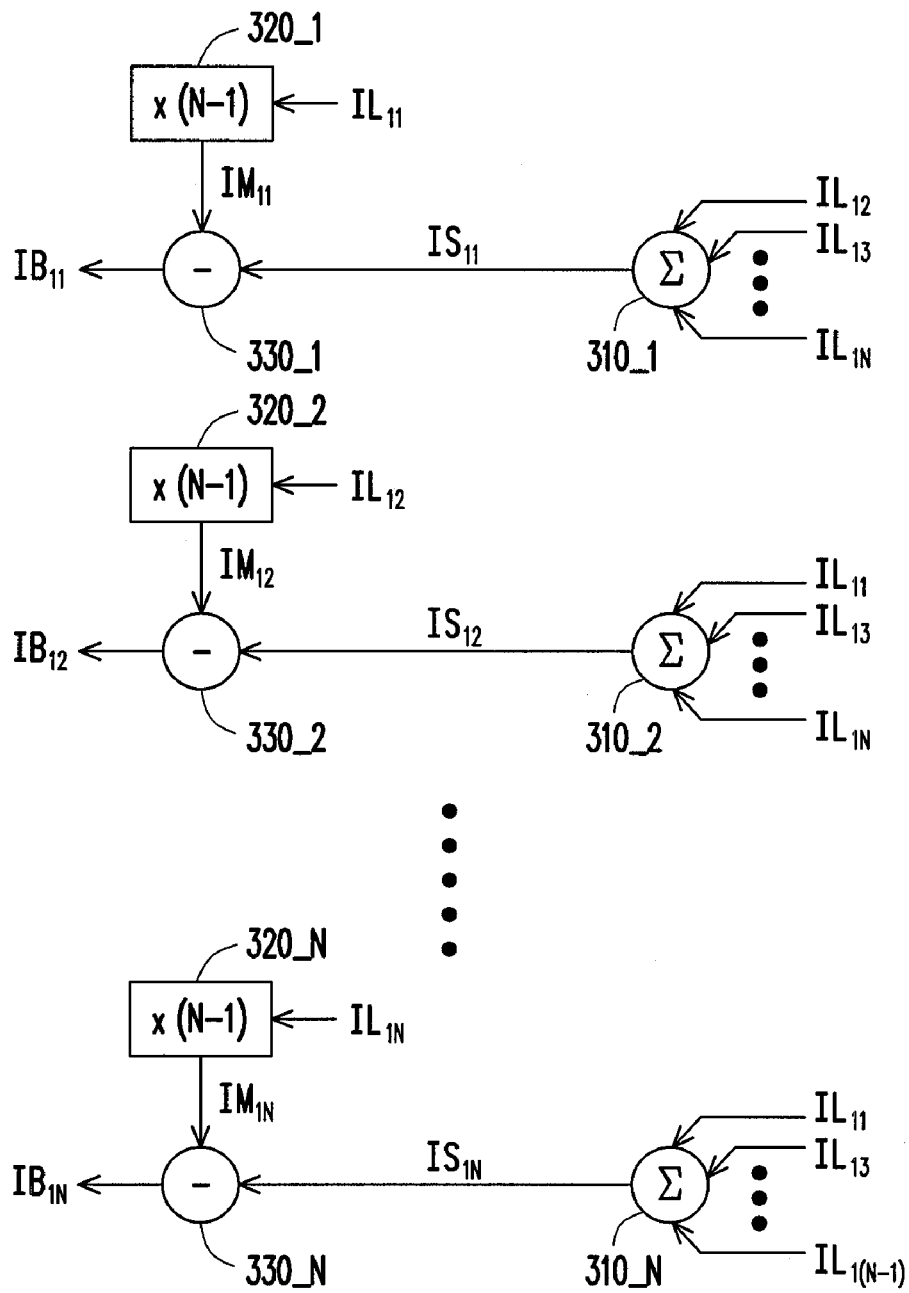
FIG. 3 is a block diagram illustrating an error detection unit according to another embodiment of the invention.

Moreover, FIG. 3 is a block diagram illustrating an error detection unit according to another embodiment of the invention. Referring to FIG. 3, the error detection unit 121 includes N adders 310_1-310_N, N multipliers 320_1-320_N, and N subtracters 330_1-330_N. The adder 310_1, the multiplier 320_1, and the subtracter 330_1 form a calculation path based on the channel current $IL_{11}$ for generating the error current $IB_{11}$. In detail, the adder 310_1 accumulates the channel currents $IL_{12}$-$IL_{1N}$ except the channel current $IL_{11}$ for generating a sum current $IS_{11}$. The multiplier 320_1 multiplies the channel current $IL_{11}$ by (N−1) to generate a multiplication current $IM_{11}$. The subtracter 330_1 subtracts the sum current $IS_{11}$ from the multiplication current $IM_{11}$ to generate the error current $IB_{11}$. In other words, the error current $IB_{11}$ is calculated according to a following equation (3):

$$IB_{11} = (N-1) \times IL_{11} - (IL_{12} + IL_{13} + \ldots + IL_{1N}) \tag{3}$$

Similarly, the adder 310_2, the multiplier 320_2, and the subtracter 330_2 form a calculation path based on the channel current $IL_{12}$ for generating the error current $IB_{12}$. In detail, the adder 310_2 accumulates the channel currents $IL_{11}$, $IL_{13}$-$IL_{1N}$ except the channel current $IL_{12}$ for generating a sum current $IS_{12}$. The multiplier 320_2 multiplies the channel current $IL_{12}$ by (N−1) to generate a multiplication current $IM_{12}$. The subtracter 330_2 subtracts the sum current $IS_{12}$ from the multiplication current $IM_{12}$ to generate the error current $IB_{12}$. In other words, the error current $IB_{12}$ is calculated according to a following equation (4):

$$IB_{12} = (N-1) \times IL_{12} - (IL_{11} + IL_{13} + \ldots + IL_{1N}) \tag{4}$$

Operations of the other adders 310_3-310_N, the dividers 320_3-320_N, and the subtracters 330_3-330_N can be deduced by analogy. In this way, similar to the embodiment of FIG. 2, when the channel currents $IL_{11}$-$IL_{1N}$ are not balanced, the error detection unit 121 generates the error currents $IB_{11}$-$IB_{1N}$ that are not equal to zero. Comparatively, when the channel currents $IL_{11}$-$IL_{1N}$ are balanced, the error currents $IB_{11}$-$IB_{1N}$ are approximately equal to zero.

Referring to FIG. 1 again, the error currents $IB_{11}$-$IB_{1N}$ are fed back to the pulse control units 122_1-122_N. Here, circuit structures of the N pulse control units 122_1-122_N are all the same. Tacking the pulse control unit 122_1 as an example, the pulse control unit 122_1 includes a charging and discharging controller 130, a current-to-voltage converter 140, a capacitor C1, and a comparator 150. The charging and discharging controller 130 provides a charging voltage or a discharging voltage according to a constant PWM signal $PWM_1$. The current-to-voltage converter 140 generates an error voltage $V_{11}$ according to the error current $IB_{11}$. Furthermore, the current-to-voltage converter 140 transmits the error voltage $V_{11}$ to the charging and discharging controller 130, so as to adjust a voltage level of the charging voltage or the discharging voltage.

Moreover, a first end of the capacitor C1 is coupled to the ground, and a second end of the capacitor C1 is electrically connected to the charging and discharging controller 130. Moreover, a positive input terminal of the comparator 150 receives a reference voltage $VR_1$, and a negative input terminal of the comparator 150 is electrically connected to the second end of the capacitor C1. In this way, the capacitor C1 can be periodically charged and discharged according to the charging voltage and the discharging voltage under the control of the constant PWM signal $PWM_1$.

When the capacitor C1 is continually discharged to cause a node voltage $V_{12}$ to be smaller than the reference voltage $VR_1$, the comparator 150 outputs a high level. Moreover, when the capacitor C1 is continually charged to cause the node voltage $V_{12}$ to be greater than the reference voltage $VR_1$, the comparator 150 outputs a low level. In this way, as the capacitor C1 is charged and discharged, the comparator 150 may generate a PWM signal $S_{11}$. It should be noticed that as the error voltage $V_{11}$ is varied, the charging voltage or the discharging voltage is correspondingly varied. In other words, the time required for charging or discharging the capacitor C1 is correspondingly varied with the error voltage $V_{11}$, so that the PWM signal $S_{11}$ generated by the comparator 150 is accordingly varied.

In other words, when the channel currents $IL_{11}$-$IL_{1N}$ are balanced, the current-to-voltage converter 140 does not vary a level of the error voltage $V_{11}$. Now, the time required for charging or discharging the capacitor C1 is not varied, so that the comparator 150 may generate the PWM signal $S_{11}$ with a constant duty cycle. Comparatively, when the channel currents $IL_{11}$-$IL_{1N}$ are not balanced, the current-to-voltage converter 140 correspondingly adjusts the level of the error voltage $V_{11}$, so as to change the time required for charging or discharging the capacitor C1. Therefore, the PWM signal $S_{11}$ generated by the comparator 150 is varied, for example, the duty cycle of the PWM signal $S_{11}$ is varied.

Further, in the embodiment, the charging and discharging controller 130 includes a current source 131 and a switch SW1. A first end of the current source 131 receives a charging voltage. Moreover, a first end of the switch SW1 is electrically connected to a second end of the current source 131, a second end of the switch SW1 is electrically connected to the current-to-voltage converter 140 so as to receive the error voltage $V_{11}$, and a third end of the switch SW1 is electrically connected to the second end of the capacitor C1.

During the operation, the error voltage $V_{11}$ is regarded as a discharging voltage. The third end of the switch SW1 is conducted to the first end or the second end thereof according to the constant PWM signal $PWM_1$. In this way, when the third end of the switch SW1 is electrically connected to the first end thereof, the charging and discharging controller 130 provides a charging path $P_{11}$, so that the capacitor C1 can be charged according to the charging voltage. Wherein, the current source 131 relates to the input voltage $VIN_1$. Moreover, when the third end of the switch SW1 is electrically connected to the second end thereof, the charging and discharging controller 130 provides a discharging path $P_{12}$, so that the capacitor C1 can be discharged according to the discharging voltage (e.g. the error voltage $V_{11}$). Because the voltage level of the discharging voltage (e.g. the error voltage $V_{11}$) is varied, an initial charging voltage of the capacitor C1 is varied when the capacitor C1 begins to charge. In this way, the time required for charging the capacitor C1 is correspondingly varied with the error voltage $V_{11}$.

Moreover, the current-to-voltage converter 140 includes an amplifier 141 and a resistor R1. A positive input terminal of the amplifier 141 receives the error current $IB_{11}$, and a negative input terminal of the amplifier 141 is electrically connected to an output terminal thereof. A first end of the resistor R1 is electrically connected to the positive input terminal of the amplifier 141, and a second end of the resistor R1 is coupled to the ground. During the operation, the error current $IB_{11}$ flowing through the resistor R1 generates a voltage difference at the positive input terminal of the amplifier 141. Moreover, a connection structure of the amplifier 141 forms a buffer, so that the voltage difference can be output by the output terminal of the amplifier 141, so as to generate the error voltage $V_{11}$.

Figure 4:
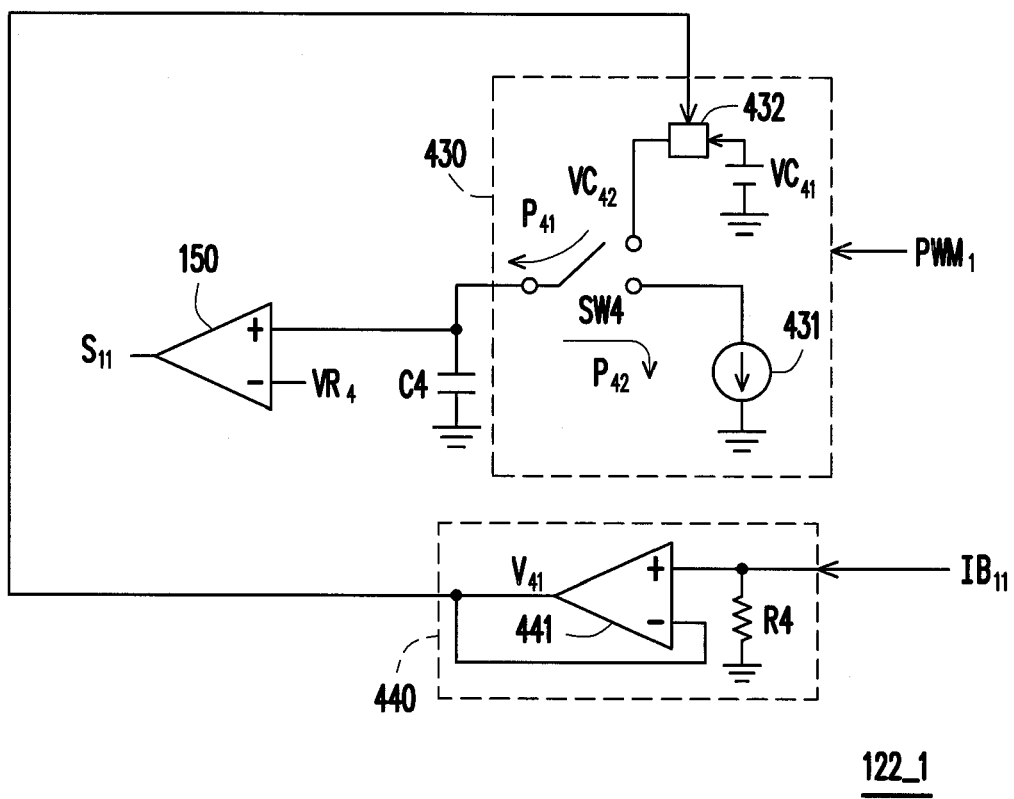
FIG. 4 is a circuit diagram of a pulse control unit according to another embodiment of the invention.

A detail structure of the pulse control unit is introduced with reference of FIG. 1, though the invention is not limited thereto. For example, FIG. 4 is a circuit diagram of a pulse control unit according to another embodiment of the invention. In the present embodiment, the pulse control unit 122_1 is taken as an example. The pulse control unit 122_1 includes a charging and discharging controller 430, a current-to-voltage converter 440, a capacitor C4, and a comparator 450. During the operation, the charging and discharging controller 430 provides a charging voltage or a discharging voltage according to the constant PWM signal $PWM_1$, so as to charge or discharge the capacitor C4. Moreover, as the capacitor C4 is charged or discharged, the comparator 450 switches a level of an output signal thereof with reference of a reference voltage $VR_4$, so as to generate the PWM signal $S_{11}$. Moreover, the current-to-voltage converter 440 generates a corresponding error voltage $V_{41}$ according to the error current $IB_{11}$, so as to adjust a voltage level of the charging voltage. In this way, when the channel currents $IL_{11}$-$IL_{1N}$ are not balanced, the PWM signal $S_{11}$ is accordingly varied.

On the other hand, a detail structure of the charging and discharging controller 430 of FIG. 4 is different to that of the charging and discharging controller 130 of FIG. 1. Referring to FIG. 4, the charging and discharging controller 430 includes a current source 431, a subtracter 432 and a switch SW4. A first end of the current source 431 is connected to a discharging voltage (e.g. the ground voltage). A first end of the switch SW4 is electrically connected to the subtracter 432, a second end of the switch SW4 is electrically connected to a second end of the current source 431, and a third end of the switch SW4 is electrically connected to the second end of the capacitor C4. The subtracter 432 is electrically connected to the current-to-voltage converter 440, and receives a power voltage $VC_{41}$.

During the operation, the subtracter 432 subtracts the error voltage $V_{41}$ from the power voltage $VC_{41}$ to generate a charging voltage $VC_{42}$. In this way, the charging voltage $VC_{42}$ is correspondingly varied with the error voltage $V_{41}$. Moreover, the third end of the switch SW4 is conducted to the first end or the second end thereof according to the constant PWM signal $PWM_1$. When the third end of the switch SW4 is electrically connected to the first end thereof, the charging and discharging controller 430 provides the charging path $P_{41}$, so as to charge the capacitor C4 according to the charging voltage $V_{42}$. Wherein, the current source 431 relates to the input voltage $VIN_1$. Moreover, when the third end of the switch SW4 is electrically connected to the second end thereof, the charging and discharging controller 430 provides the discharging path $P_{42}$, so as to discharge the capacitor C4 according to the discharging voltage. Because the voltage level of the charging voltage $VC_{42}$ is varied with the error voltage $V_{41}$, an initial discharging voltage of the capacitor C4 is varied when the capacitor C4 begins to discharge. In this way, the time required for discharging the capacitor C4 is correspondingly varied with the error voltage $V_{41}$. Moreover, the current-to-voltage converter 440 includes an amplifier 441 and a resistor R4. A detail structure of the current-to-voltage converter 440 is similar to that of the current-to-voltage converter 140 of FIG. 1, so that detailed description thereof is not repeated.

Figure 5:
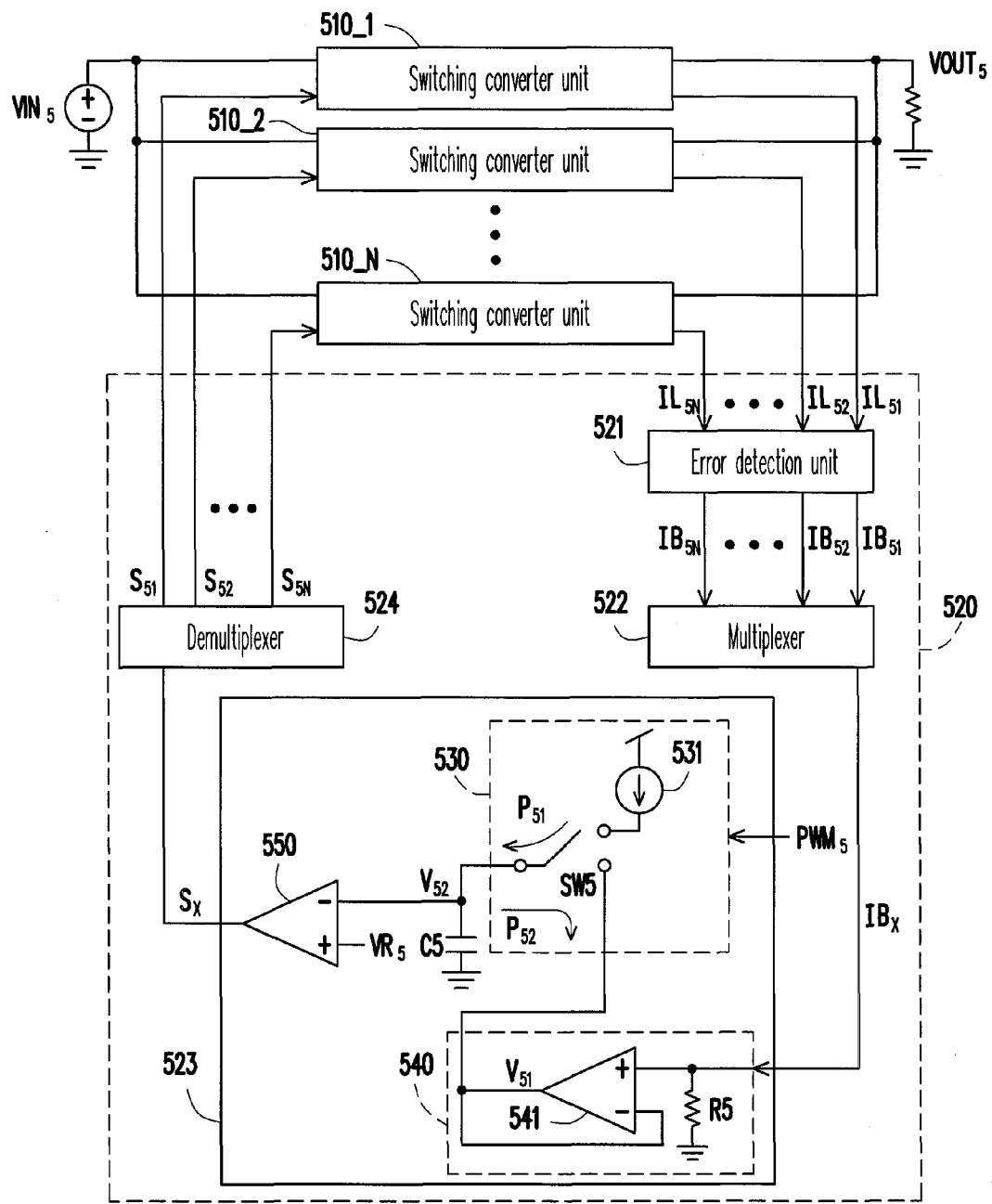
FIG. 5 is a structural schematic diagram illustrating a multi-phase power converting device according to an embodiment of the invention.

FIG. 5 is a structural schematic diagram illustrating a multi-phase power converting device according to an embodiment of the invention. Referring to FIG. 5, the multi-phase power converting device 500 includes N switching converter units 510_1-510_N and a current balancer 520, wherein N is an integer greater than or equal to 2. The switching converter units 510_1-510_N are connected in parallel, and convert an input voltage $VIN_5$ into an output voltage $VOUT_5$ under control of N PWM signals $S_{51}$-$S_{5N}$.

The current balancer 520 and the switching converter units 510_1-510_N form a feedback loop, so as to control the PWM signals $S_{51}$-$S_{5N}$ according to a feedback mechanism. In this way, N channel currents $IL_{51}$-$IL_{5N}$ generated by the switching converter units 510_1-510_N can be balanced, so that a power conversion efficiency of the multi-phase power converting device 500 is improved. To fully convey the spirit of the invention to those skilled in the art, a structure and an operation principle of the current balancer 520 are described in detail below.

The current balancer 520 includes an error detection unit 521, a multiplexer 522, a pulse control unit 523 and a demultiplexer 524. The error detection unit 521 detects the N channel currents $IL_{51}$-$IL_{5N}$, and generates N error currents $IB_{51}$-$IB_{5N}$ by calculating the channel currents $IL_{51}$-$IL_{5N}$. Moreover, the error detection unit 521 of FIG. 5 is similar to the error detection unit 121 of FIG. 1.

When the channel currents $IL_{11}$-$IL_{1N}$ are not balanced, the error detection unit 521 generates the error currents $IB_{51}$-$IB_{5N}$ that are not equal to zero. Comparatively, when the channel currents $IL_{51}$-$IL_{5N}$ are balanced, the error currents $IB_{51}$-$IB_{5N}$ are approximately equal to zero. Moreover, a detail structure of the error detection unit 521 can be implemented by adders, dividers and subtracters according to the embodiment of FIG. 2, or can be implemented by adders, multipliers and subtracters according to the embodiment of FIG. 3. Therefore, the detail structure of the error detection unit 521 and operations thereof are not repeated.

Referring to FIG. 5, the multiplexer 522 receives the error currents $IB_{51}$-$IB_{5N}$. Moreover, the multiplexer 522 outputs the error current $IB_{51}$-$IB_{5N}$ one-by-one, so that a post-end circuit may process each of the error current $IB_{51}$-$IB_{5N}$. Moreover, the error current output by the multiplexer 522 is regarded as a specific error current $IB_X$, and the specific error current $IB_X$ is transmitted to the pulse control unit 523. In this way, the pulse control unit 523 generates a PWM signal $S_X$ according to a constant PWM signal $PWM_5$ and the specific error current $IB_X$.

On the other hand, the demultiplexer 524 receives the PWM signal $S_X$ and transmits the PWM signal $S_X$ to one of the switching converter units 510_1-510_N according to an operation of the multiplexer 522. For example, when the multiplexer 522 selects to output the error current $IB_{51}$, i.e. when the error current $IB_{51}$ is regarded as the specific error current $IB_X$, the demultiplexer 524 correspondingly transmits the PWM signal $S_X$ to the switching converter unit 510_1. In this way, the PWM signal $S_X$ is regarded as the PWM signal $S_{51}$ used for controlling the switching converter unit 510_1, so that the channel current $IL_{51}$ is accordingly varied.

In other words, a main difference between the embodiments of FIG. 5 and FIG. 1 is that in the embodiment of FIG. 5, by using the multiplexer 522 and the demultiplexer 524, the pulse control unit 523 can sequentially control the switching converter units 510_1-510_N. While in the embodiment of FIG. 1, a plurality of the pulse control units 122_1-122_N is used to one-to-one control the switching converter units 110_1-110_N. Wherein, a detail structure of the pulse control unit 523 of FIG. 5 is similar to that of the pulse control units 122_1-122_N of FIG. 1.

For example, the pulse control unit 523 includes a charging and discharging controller 530, a current-to-voltage converter 540, a capacitor C5, and a comparator 550. The charging and discharging controller 530 provides a charging voltage or a discharging voltage according to the constant PWM signal $PWM_5$. The current-to-voltage converter 540 generates an error voltage $V_{51}$ according to the specific error current $IB_X$. Moreover, the current-to-voltage converter 540 transmits the error voltage $V_{51}$ to the charging and discharging controller 530, so as to adjust a voltage level of the charging voltage or the discharging voltage. Two ends of the capacitor C5 are respectively connected to the charging and discharging controller 530 and the ground. The comparator 550 compares a reference voltage $VR_5$ with a node voltage $V_{52}$ generated at a second end of the capacitor C5.

In this way, under control of the constant PWM signal $PWM_5$, the capacitor C5 is periodically charged and discharged according to the charging voltage and the discharging voltage, so that the node voltage $V_{52}$ is accordingly varied. Comparatively, as a voltage level of the node voltage $V_{52}$ is varied, the comparator 550 may generate the PWM signal $S_X$. For example, when the node voltage $V_{52}$ is smaller than the reference voltage $VR_5$, the comparator 550 outputs the PWM signal $S_X$ with a high level. Conversely, when the node voltage $V_{52}$ is greater than the reference voltage $VR_5$, the comparator 550 outputs the PWM signal $S_X$ with a low level.

It should be noticed that when the channel currents $IL_{51}$-$IL_{5N}$ are balanced, i.e. when the specific error current $IB_X$ is approximately equal to zero, the current-to-voltage converter 540 does not change a level of the error voltage $V_{51}$. Now, time required for charging or discharging the capacitor C5 is not varied, so that the comparator 550 may generate the PWM signal $S_X$ with a constant duty cycle. Comparatively, when the channel currents $IL_{51}$-$IL_{5N}$ are not balanced, i.e. when the specific error current $IB_X$ is not equal to zero, the current-to-voltage converter 540 correspondingly adjusts the level of the error voltage $V_{51}$. Now, the time required for charging or discharging the capacitor C5 is correspondingly varied, so that the PWM signal $S_X$ generated by the comparator 550 is accordingly varied.

Moreover, in the embodiment, the charging and discharging controller 530 includes a current source 531 and a switch SW5, and the current-to-voltage converter 540 includes an amplifier 541 and a resistor R5. Detail structures of the charging and discharging controller 530 and the current-to-voltage converter 540 are similar to that of the charging and discharging controller 130 and the current-to-voltage converter 140 of FIG. 1, so that detail descriptions of the charging and discharging controller 530 and the current-to-voltage converter 540 are not repeated. Moreover, the detail structure of the charging and discharging controller 530 can be implemented according to the embodiment of FIG. 4.

In summary, in the invention, the pulse control unit is used to control the PWM signals required by the switching converter units. Wherein, the pulse control unit uses the charging and discharging controller to periodically charge and discharge the capacitor therein, so as to generate the constant PWM signal when the channel currents are balanced. Moreover, when the channel currents generated by the switching converter units are not balanced, an error voltage generated by the current-to-voltage converter is used to adjust a voltage level of the charging voltage or the discharging voltage, so as to correspondingly vary the PWM signal. In this way, the current balancer can maintain a balance of the channel currents, so as to improve a power conversion efficiency of the multi-phase power converting device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A current balancer, suitable for a multi-phase power converting device, wherein the multi-phase power converting device comprises N switching converter units, and N is an integer greater than or equal to 2, the current balancer comprising:
   an error detection unit, for detecting N channel currents generated by the switching converter units, and generating N error currents by calculating the channel currents; and
   N pulse control units, for generating N pulse-width modulation (PWM) signals according to a constant PWM signal and the error currents, so as to control the switching converter units, wherein i is an integer, and $1 \leq i \leq N$, and an i-th pulse control unit comprises:
      a charging and discharging controller, for providing a charging voltage or a discharging voltage according to the constant PWM signal;
      a current-to-voltage converter, for generating an error voltage according to an i-th error current, and transmitting the error voltage to the charging and discharging controller so as to adjust a voltage level of the charging voltage or the discharging voltage;
      a capacitor, having a first end electrically connected to a ground, and a second end electrically connected to the charging and discharging controller, so as to be charged or discharged according to the charging voltage or the discharging voltage; and
      a comparator, having a positive input terminal receiving a reference voltage, a negative input terminal electrically connected to the second end of the capacitor, and an output terminal generating an i-th PWM signal.

2. The current balancer as claimed in claim 1, wherein the current-to-voltage converter comprises:
   an amplifier, having a positive input terminal receiving the i-th error current, a negative input terminal electrically connected to an output terminal, and the output terminal generating the error voltage; and
   a resistor, having a first end electrically connected to the positive input terminal of the amplifier, and a second end electrically connected to the ground.

3. The current balancer as claimed in claim 1, wherein the charging and discharging controller comprises:
   a first current source, having a first end receiving the charging voltage; and
   a first switch, having a first end electrically connected to a second end of the first current source, a second end receiving the discharging voltage, and a third end electrically connected to the second end of the capacitor, wherein the third end of the first switch is conducted to the first end or the second end of the first switch according to the constant PWM signal, and the discharging voltage is equal to the error voltage.

4. The current balancer as claimed in claim 1, wherein the charging and discharging controller comprises:
   a first subtracter, for subtracting the error voltage from a power voltage so as to generate the charging voltage;
   a second current source, having a first end electrically connected to the discharging voltage; and
   a second switch, having a first end electrically connected to the first subtracter, a second end electrically connected to a second end of the second current source, and a third end electrically connected to the second end of the capacitor, wherein the third end of the second switch is conducted to the first end or the second end of the second switch according to the constant PWM signal.

5. The current balancer as claimed in claim 1, wherein the error detection unit comprises:
   N first adders, for generating N sum currents, wherein an i-th first adder accumulates the channel currents except an i-th channel current, so as to generate an i-th sum current;
   N dividers, for generating N average currents, wherein an i-th divider divides the i-th sum current by (N−1) to generate an i-th average current; and
   N second subtracters, wherein an i-th second subtracter subtracts the i-th average current from the i-th channel current to generate the i-th error current.

6. The current balancer as claimed in claim 1, wherein the error detection unit comprises:
   N second adders, for generating N sum currents, wherein an i-th second adder accumulates the channel currents except an i-th channel current, so as to generate an i-th sum current;
   N multipliers, for generating N multiplication currents, wherein an i-th multiplier multiplies the i-th channel current by (N−1) to generate an i-th multiplication current; and
   N third subtracters, wherein an i-th third subtracter subtracts the i-th sum current from the i-th multiplication current to generate the i-th error current.

7. A current balancer, suitable for a multi-phase power converting device, wherein the multi-phase power converting device comprises N switching converter units, and N is an integer greater than or equal to 2, the current balancer comprising:
   an error detection unit, for detecting N channel currents generated by the switching converter units, and generating N error currents by calculating the channel currents;
   a multiplexer, for receiving the error currents and outputting the error currents one-by-one to serve as a specific error current;

a pulse control unit, for generating a pulse-width modulation (PWM) signal according to a constant PWM signal and the specific error current, and comprising:
- a charging and discharging controller, for providing a charging voltage or a discharging voltage according to the constant PWM signal;
- a current-to-voltage converter, for generating an error voltage according to the specific error current, and transmitting the error voltage to the charging and discharging controller so as to adjust a voltage level of the charging voltage or the discharging voltage;
- a capacitor, having a first end electrically connected to a ground, and a second end electrically connected to the charging and discharging controller, so as to be charged or discharged according to the charging voltage or the discharging voltage; and
- a comparator, having a positive input terminal receiving a reference voltage, and a negative input terminal electrically connected to the second end of the capacitor, and an output terminal generating the PWM signal; and
- a demultiplexer, for receiving the PWM signal and transmitting the PWM signal to one of the switching converter units according to an operation of the multiplexer.

8. The current balancer as claimed in claim 7, wherein the current-to-voltage converter comprises:
- an amplifier, having a positive input terminal receiving the specific error current, a negative input terminal electrically connected to an output terminal, and the output terminal generating the error voltage; and
- a resistor, having a first end electrically connected to the positive input terminal of the amplifier, and a second end electrically connected to the ground.

9. The current balancer as claimed in claim 7, wherein the charging and discharging controller comprises:
- a first current source, having a first end receiving the charging voltage; and
- a first switch, having a first end electrically connected to a second end of the first current source, a second end receiving the discharging voltage, and a third end electrically connected to the second end of the capacitor, wherein the third end of the first switch is conducted to the first end or the second end of the first switch according to the constant PWM signal, and the discharging voltage is equivalent to the error voltage.

10. The current balancer as claimed in claim 7, wherein the charging and discharging controller comprises:
- a first subtracter, for subtracting the error voltage from a power voltage so as to generate the charging voltage;
- a second current source, having a first end electrically connected to the discharging voltage; and
- a second switch, having a first end electrically connected to the first subtracter, a second end electrically connected to a second end of the second current source, and a third end electrically connected to the second end of the capacitor, wherein the third end of the second switch is conducted to the first end or the second end of the second switch according to the constant PWM signal.

11. The current balancer as claimed in claim 7, wherein the error detection unit comprises:
- N first adders, for generating N sum currents, wherein an i-th first adder accumulates the channel currents except an i-th channel current, so as to generate an i-th sum current, wherein i is an integer and $1 \leq i \leq N$;
- N dividers, for generating N average currents, wherein an i-th divider divides the i-th sum current by (N−1) to generate an i-th average current; and
- N second subtracters, wherein an i-th second subtracter subtracts the i-th average current from the i-th channel current to generate an i-th error current.

12. The current balancer as claimed in claim 7, wherein the error detection unit comprises:
- N second adders, for generating N sum currents, wherein an i-th second adder accumulates the channel currents except an i-th channel current, so as to generate an i-th sum current, wherein i is an integer and $1 \leq i \leq N$;
- N multipliers, for generating N multiplication currents, wherein an i-th multiplier multiplies the i-th channel current by (N−1) to generate an i-th multiplication current; and
- N third subtracters, wherein an i-th third subtracter subtracts the i-th sum current from the i-th multiplication current to generate an i-th error current.

* * * * *